United States Patent [19]
Shams

[11] Patent Number: 5,877,722
[45] Date of Patent: Mar. 2, 1999

[54] SEARCH METHOD FOR DETECTION AND TRACKING OF TARGETS USING MULTIPLE ANGLE-ONLY SENSORS

[75] Inventor: Soheil Shams, Los Angeles, Calif.

[73] Assignee: Hughes Electronics Corporation, El Segundo, Calif.

[21] Appl. No.: 918,072

[22] Filed: Aug. 25, 1997

[51] Int. Cl.[6] .................................................. G01S 13/42
[52] U.S. Cl. ......................... 342/147; 342/417; 342/444
[58] Field of Search ............................... 342/13, 56, 107, 342/113, 146, 147, 156, 417, 444

[56] References Cited

U.S. PATENT DOCUMENTS

| | | | |
|---|---|---|---|
| 3,750,174 | 7/1973 | Belluck | 342/17 |
| 3,761,926 | 9/1973 | Berger | 342/113 |
| 3,786,505 | 1/1974 | Rennie | 342/33 |
| 4,106,731 | 8/1978 | Bliss | 244/188 |
| 4,212,443 | 7/1980 | Duncan et al. | 244/177 |
| 4,405,986 | 9/1983 | Gray | 364/434 |
| 4,806,936 | 2/1989 | Williams et al. | 342/126 |
| 4,914,604 | 4/1990 | Castelaz | 364/517 |
| 5,307,289 | 4/1994 | Harris | 364/516 |
| 5,680,514 | 10/1997 | Shams | 395/22 |

OTHER PUBLICATIONS

Pattipatti et al, "A New Relaxation Algorithm and Passive Sensor Data Association", IEEE Transactions on Automatic Control, vol. 37, No. 2, Feb. 1992, pp. 198–213.

*Primary Examiner*—John B. Sotomayor
*Attorney, Agent, or Firm*—V. D. Duraiswamy; W. K. Denson-Low

[57] ABSTRACT

A method of detection and tracking of targets using multiple angle-only sensors is disclosed. The method is computationally efficient and is capable of detecting and tracking multiple targets in true three dimensional space. The method comprises distributing a set of modules in space and associating those modules with bearing lines from each sensor to each target. Through repetitive iterative associations between modules and bearing lines, the modules converge on the targets present.

17 Claims, 6 Drawing Sheets

SEARCH METHOD FOR DETECTION AND TRACKING OF TARGETS USING MULTIPLE ANGLE-ONLY SENSORS

BACKGROUND OF THE INVENTION (a) Field of the Invention

The present invention generally relates to target detection and tracking, and more specifically to a search method for target detection and tracking using multiple angle-only sensors.

(b) Description of Related Art

Historically, electronic tracking systems were able to compute and track the coordinates of a target by measuring its angle of approach and its range. However, in many instances, only the approach angle of the target is available because the range information is often electronically jammed.

Ideally, given at least two sets of approach angle data per target, it is possible to determine the location of the targets. The target location may be determined, for example, by the intersection of the angle data from a pair of sensors. The difficulty with using angle-only methods is that associating bearing lines (i.e., imaginary lines drawn between sensors and targets) with multiple targets requires a substantial search space which may be on the order of $(N!)^{S-1}$, where N is the number of targets and S is the number of sensors in the system. Locating and tracking targets within the search space requires a significant amount of time and computing power.

A number of methods for solving the above-referenced locating and tracking problem have been proposed. One method, known generally as a multiple elastic feature network (MEFN), associates a number of intersection points of bearing lines to locate and track targets. This is accomplished with N independent sets of M feature specific neurons, or artificial intelligence elements, that respond to the temporal properties of the targets. This method only functions as a two dimensional abstraction of a three dimensional system, using few (approx. three) sensors.

Pattipati et al., "A New Relaxation Algorithm and Passive Sensor Data Association," IEEE Transactions on Automatic Control, 37(2) 1992 pp. 198–213, discloses an approach based on optimization of the log likelihood function using the Lagarangian relaxation method. This method has similar computational complexity to the MEFN method described above, however it is only used for target detection and not for target tracking.

Accordingly, there is a need for a method of rapidly and efficiently detecting and tracking targets in three dimensional space using numerous sensors.

SUMMARY OF THE INVENTION

The present invention is embodied in a method for efficiently detecting and tracking targets in two or three dimensional space. The method of the present invention searches a state space and establishes a correspondence between different bearing lines (i.e., imaginary lines between sensors and targets) and different targets.

An important problem addressed by the present invention is that of detecting and tracking multiple targets in a given area using a number of sensors. The location of each sensor is known. A set of modules is randomly distributed throughout the given search space. The initial distribution of the modules is a random guess as to where the actual targets are within the search space. The number of modules used is preferably greater than the number of targets detected. This ensures that there is at least one module for each actual target. The actual targets are found through a repetitive process of associating each module with a bearing line. With each iteration of the above-referenced procedure, a given module is updated and "moved" closer to its corresponding target. Thus, after a sufficient number of iterations, each module represents the actual position of its corresponding target.

The present invention may be embodied in a method for detecting and tracking targets, the steps of the method including determining a first bearing line from a first sensor to a target; determining a second bearing line from a second sensor to said target; distributing modules throughout a search space that includes said target, said modules providing location information; associating at least one of said modules with said first bearing line; associating at least one of said modules with said second bearing line; continuing to associate said at least one of modules with said first and second bearing lines until said at least one of said modules is substantially coincident with said target; and using location information of said at least one of said modules to indicate said location of said target.

In an alternative representation of the invention, the above-referenced modules denote current and previous locations in space and are changeable based on said angle-only sensor outputs.

In another alternative representation of the invention, the above-referenced "associating of said modules and said bearing lines" may be based on angular distance between said modules and said bearing lines.

In another alternative representation of the invention, the above-referenced "associating of said modules and said bearing lines" may be based on the proximity of receptive fields of said modules to said bearing lines.

In another alternative representation of the invention, the above-referenced "associating of said modules and said bearing lines" may be based on the calculation of a competition vector based on parameters of said modules.

In another alternative representation of the invention, the above-referenced method may be used to track and detect targets in two or three dimensional space.

The present invention may also be embodied in an apparatus for detecting and tracking multiple targets comprising two sensors in communication with a signal processing installation, wherein the signal processing installation determines a first bearing line from a first sensor to a target; determines a second bearing line from a second sensor to said target; distributes modules throughout a search space that includes said target, said modules providing location information; associates at least one of said modules with said first bearing line; associates at least one of said modules with said second bearing line; continues to associate said at least one of modules with said first and second bearing lines until said at least one of said modules is substantially coincident with said target; and indicates said location of said target.

In an alternative embodiment of the above-referenced apparatus, said sensors output signals representative of a target position.

In another alternative embodiment of the above-referenced apparatus, said sensors provide only angle position information of said targets.

In another alternative embodiment of the above-referenced apparatus, said signal processing installation includes a conventional workstation computer.

In another alternative embodiment of the above-referenced apparatus, said sensors may be distributed within three dimensional space.

The invention itself, together with further objects and attendant advantages, will best be understood by reference to the following detailed description, taken in conjunction with the accompanying drawings.

DESCRIPTION OF THE PREFERRED EMBODIMENTS

The present invention is embodied in a method for efficiently detecting and tracking targets in two or three dimensional space. The method of the present invention searches a state space and establishes a correspondence between different bearing lines (i.e., imaginary lines between sensors and targets) and different targets.

An important problem addressed by the present invention is that of detecting and tracking multiple targets in a given area using a number of sensors. The location of each sensor is known. A set of modules is randomly distributed throughout the given search space. The modules denote specific points in three-dimensional space. Each module can be updated based on information provided by the sensors. Each module has with it terms which limit its extent in space and indicate its previous position in space. The initial distribution of the modules is a random guess as to where the actual targets are within the search space. The number of modules used is preferably greater than the number of targets detected. This ensures that there is at least one module for each actual target. The actual targets are found through a repetitive process of associating each module with a bearing line. With each iteration of the above-referenced procedure, a given module is updated and "moved" closer to its corresponding target. Thus, after a sufficient number of iterations, each module represents the actual position of its corresponding target. The present invention is capable of tracking more than thirty targets in real-time on a typical workstation when using five sensors.

Figure 1:
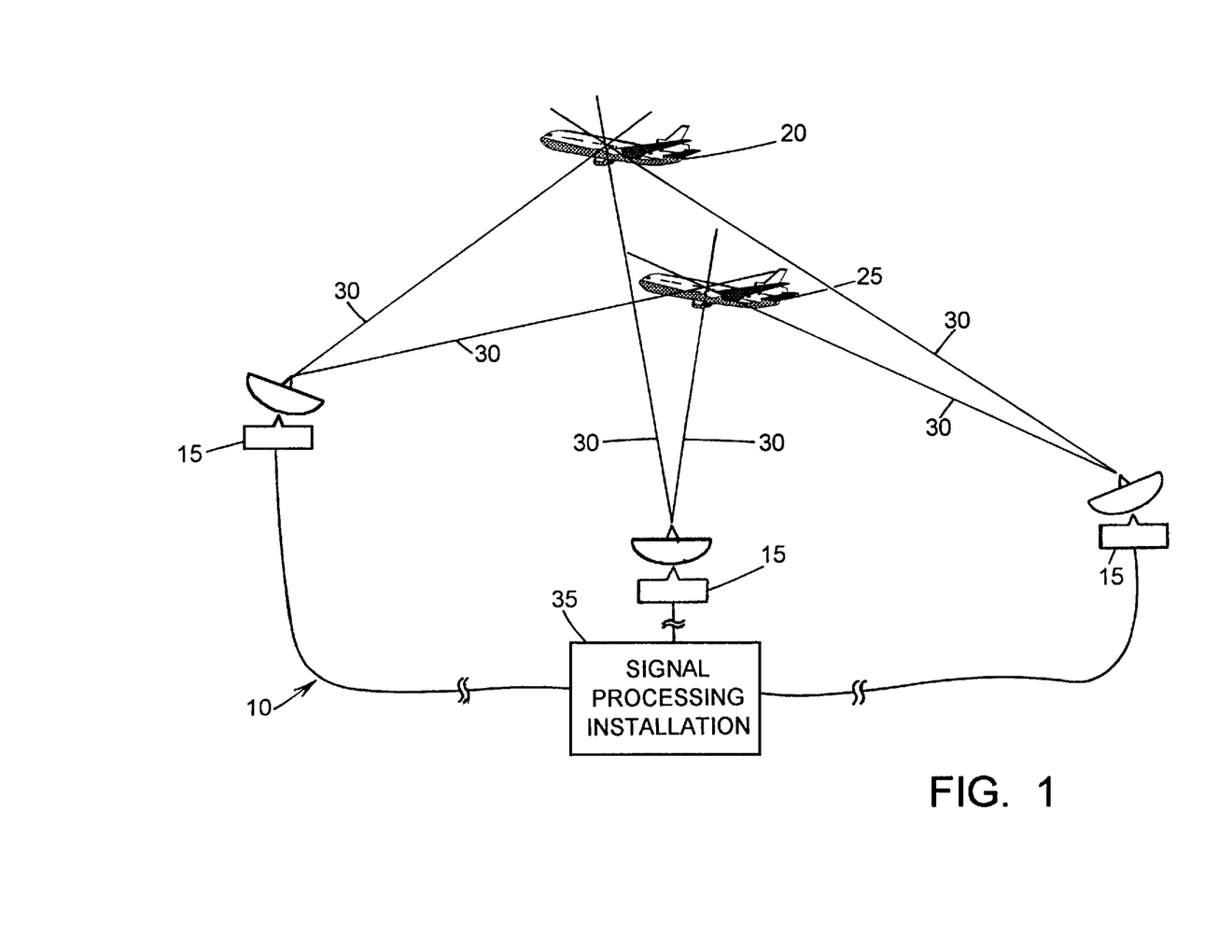
FIG. 1 is an illustration of target detection and tracking system that may employ the present invention.

FIG. 1 is an illustration of a target detection and tracking system 10 that may employ the present invention. The target tracking and detection system 10 includes multiple target sensors 15, that are capable of sensing the angular position of multiple targets 20, 25. As the sensors 15 detect the targets 20, 25 imaginary bearing lines 30 are drawn from each sensor 15 to each target 20, 25. Bearing lines 30 represent the angular position of each target 20, 25 with respect to each sensor 15. Target-to-sensor distance information may not be available or reliable, therefore the present invention relies only on angular positions to determine the locations of the targets. Each sensor 15 relays the bearing line information for each target 20, 25 to a signal processing installation 35, which may be a typical computer workstation. The information from the sensors 15 may be relayed via a number of methods including, a terrestrial link, a wireless link, or a satellite link. Once the bearing line information is received by the signal processing installation 35 it is used to determine the position of the targets. The signal processing installation 35 combines bearing line information from the sensors 15 with the physical location of the sensors 15 to produce target position information, according to the method and apparatus of the present invention.

Figure 2:
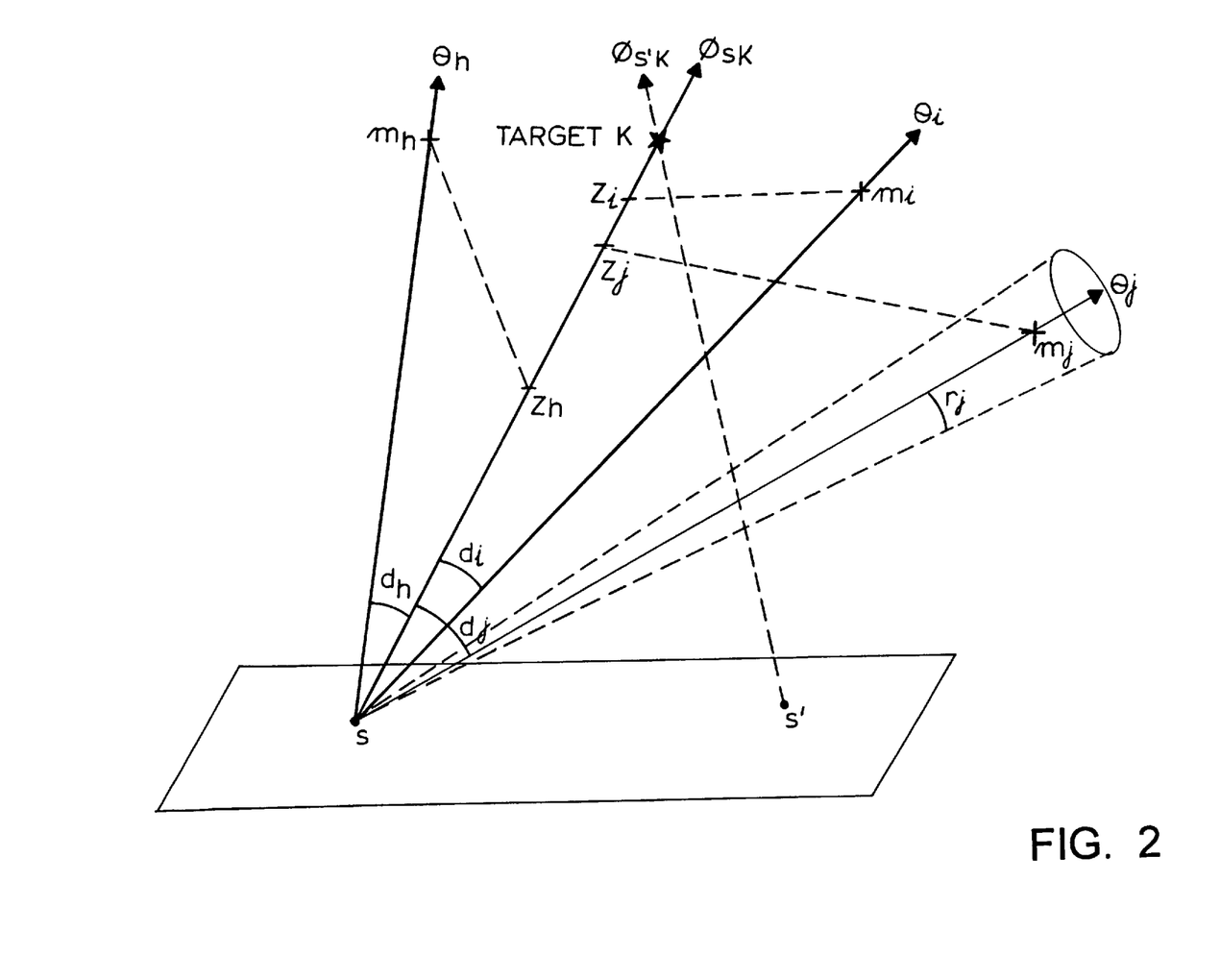
FIG. 2 is a graphic illustration of the method by which targets are detected and tracked using the present invention.

A graphical representation of the operation of the method of the present invention will now be given in reference to FIG. 2. FIG. 2 illustrates a scenario wherein there are two sensors (s, s') capable of providing angular position information on a target (target k) placed within the region. The sensors (s, s') represent sensors 15 from FIG. 1. The sensors transfer position information to a signal processing installation 35 as shown in FIG. 1. The signal processing installation 35 is responsible for making all calculations and for moving all modules when determining the position of a target. Also shown in FIG. 2 are three modules ($m_h$, $m_i$, $m_j$), one of which will be used to determine the location of the target (target k).

When the method of the present invention begins, a first sensor s is chosen for consideration. A vector (bearing line) $\phi_{sk}$ is drawn from sensor s to target k (note that this vector only indicates direction of the target and not distance to the target, as distance information may not be available). If multiple targets are present, bearing lines will be drawn from each sensor to each target. Based on the number of bearing lines, a number of modules are initially distributed randomly throughout the search space. Modules provide a tangible representation of previous and current module position in space. The number of modules distributed will be greater than the number of bearing lines from one sensor (i.e., greater than the number of targets detected). For the particular example at hand, three modules $m_h$, $m_i$, and $m_j$ are used. Vectors $\theta_h$, $\theta_i$, and $\theta_j$ are drawn from sensor s to modules $m_h$, $m_i$, and $m_j$, respectively.

The spatial position of each module is then projected onto the vector $\phi_{sk}$ (shown in FIG. 2 as $z_h$, $z_i$, and $z_j$). The angular distances between each module and the bearing line are calculated. These angular distances are represented in FIG. 2 as $d_h$, $d_i$, and $d_j$. Each module is defined to have a receptive field of radius r, shown in FIG. 2 for module $m_j$, as $r_j$. The method of the present invention tests to see if any of the receptive fields of the modules encompass the bearing line $\phi_{sk}$. If there is a module whose receptive field overlaps the bearing line, the selected module is identified as being likely to be associated with the target. If there are multiple modules which have receptive fields that overlap the bearing line under consideration, the winning module is identified as the module with the smallest angular distance to the bearing line. If there is no receptive field overlapping the bearing line, one module is determined to be associated with the bearing line, and this module is called the winning module. The winning module may be determined by various methods. For example, the winning module may be the module which has the smallest angular distance to the bearing line. Alternatively, a competition measurement may be defined, which analyzes the cost of associating each module to a particular bearing line. The algorithm selects the module having the lowest cost and associates it to the bearing line for the sensor and target being considered.

Once the winning module has been selected, it is moved onto the bearing line $\phi_{sk}$ at the location of its projection onto the bearing line. For example as shown in FIG. 2, if module $m_h$ is the winning module, module $m_h$ will be moved to location $z_h$. A target point is moved with the winning module. The target point is the best estimation, made by the method of the present invention, of where the target is located at any given time.

The method then repeats the above-described process using the second sensor s'. Constraints on subsequent module use are such that a module may only be associated with a particular bearing line for each sensor. As the algorithm repeats the process, each module will slowly migrate toward an associated target. For example, module $m_h$ will then be associated with the bearing angle $\phi_{s'k}$ and will move alternately between bearing lines $\phi_{sk}$ and $\phi_{s'k}$ with each iteration, converging closer to the target. Because of the constraints placed on module association, situations where a module migrates toward a target with which it has not been previously associated are avoided. The constraints ensure that each module will migrate toward its associated target with each iteration. After sufficient iteration, each module will lie directly on its associated target, thus revealing the location of each target. For example, when considering module $m_h$ and sensor s', the movement of $m_h$ will be associated with, and moved to, bearing line $\phi_{s'k}$ in closer proximity to target k. As more iterations are completed $m_h$ will alternate between bearing lines $\phi_{sk}$ and $\phi_{s'k}$. With each iteration $m_h$ will move closer to target k. Eventually, after sufficient number of iterations $m_h$ will lie on top of target k, thus identifying the location of the target.

Figure 3:
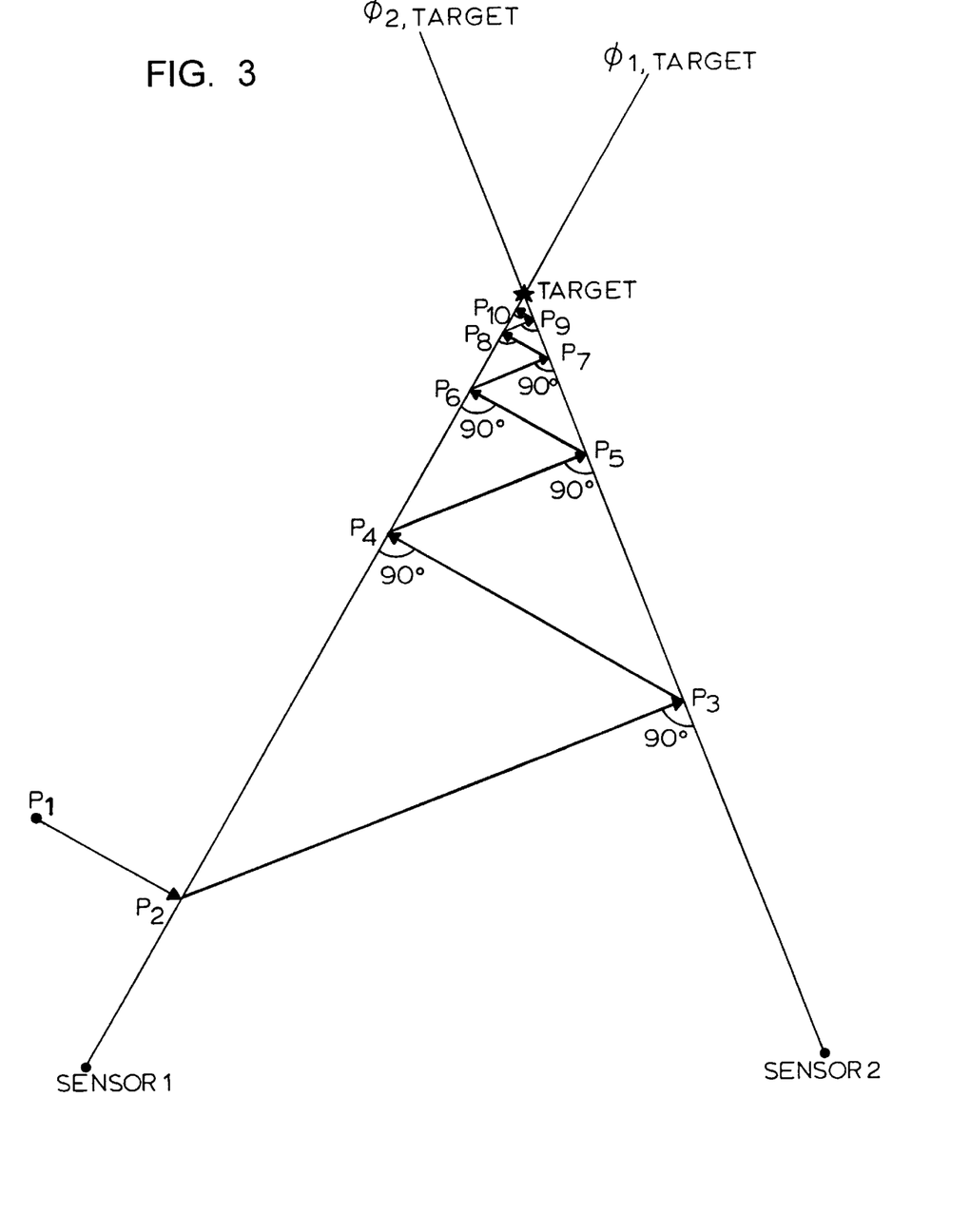
FIG. 3 is a graphic illustration representing a module converging on a target.

FIG. 3 is a illustration representing a module converging toward a target. While the method of the present invention operates in three-dimensional space, the representation shown in FIG. 3 is two-dimensional for the purposes of this description. The method of association and movement is identical in two and three dimensions, but is easier to graphically illustrate in two dimensions. When the target detection and tracking method of the present invention begins, a target is detected by sensor 1 and sensor 2. A bearing line is generated from each sensor to the target, these bearing lines are represented as $\phi_{1,target}$ and $\phi_{2,target}$. Only angle representations of the target position are available, therefore the length of each bearing line is unknown. Because a target was detected, a set of modules is randomly distributed in space. In this particular example the set of modules distributed contains only one module. The location of the module after random distribution is P1.

After random distribution of the module to location P1, the method of the present invention considers bearing line $\phi_{1,target}$. The method searches for a module to associate with $\phi_{1,target}$, the module located at P1 is chosen and moved to location P2, which is on the bearing line being considered. After associating and moving the module to location P2, the method considers the bearing line from sensor 2 to the target ($\phi_{2,target}$). Again, the goal is to associate a module with the bearing line under consideration. Since only one module is present, the module located at P2 is chosen. The chosen module is moved from location P2 to location P3, which is located on the bearing line $\phi_{2,target}$. The method then returns to consider bearing line $\phi_{1,target}$. The module located at P3 will be updated and moved to location P4. Note that each time the module is moved to a new location the module gets closer to the target because the module is moved to a perpendicular location from the current position to the new bearing line. That is, the path from the old module position to the new module position perpendicularly intersects the bearing line to which the module is being moved. The process of module and bearing line association continues for a sufficient number of iterations until the module is coincident with the target. Each time the module is selected, it is moved to the bearing line being considered. As shown in FIG. 3 the module to be associated is moved from P1 to P10 through repeated associations alternating between bearing lines $\phi_{1,target}$ and $\phi_{2,target}$.

Figure 4A:
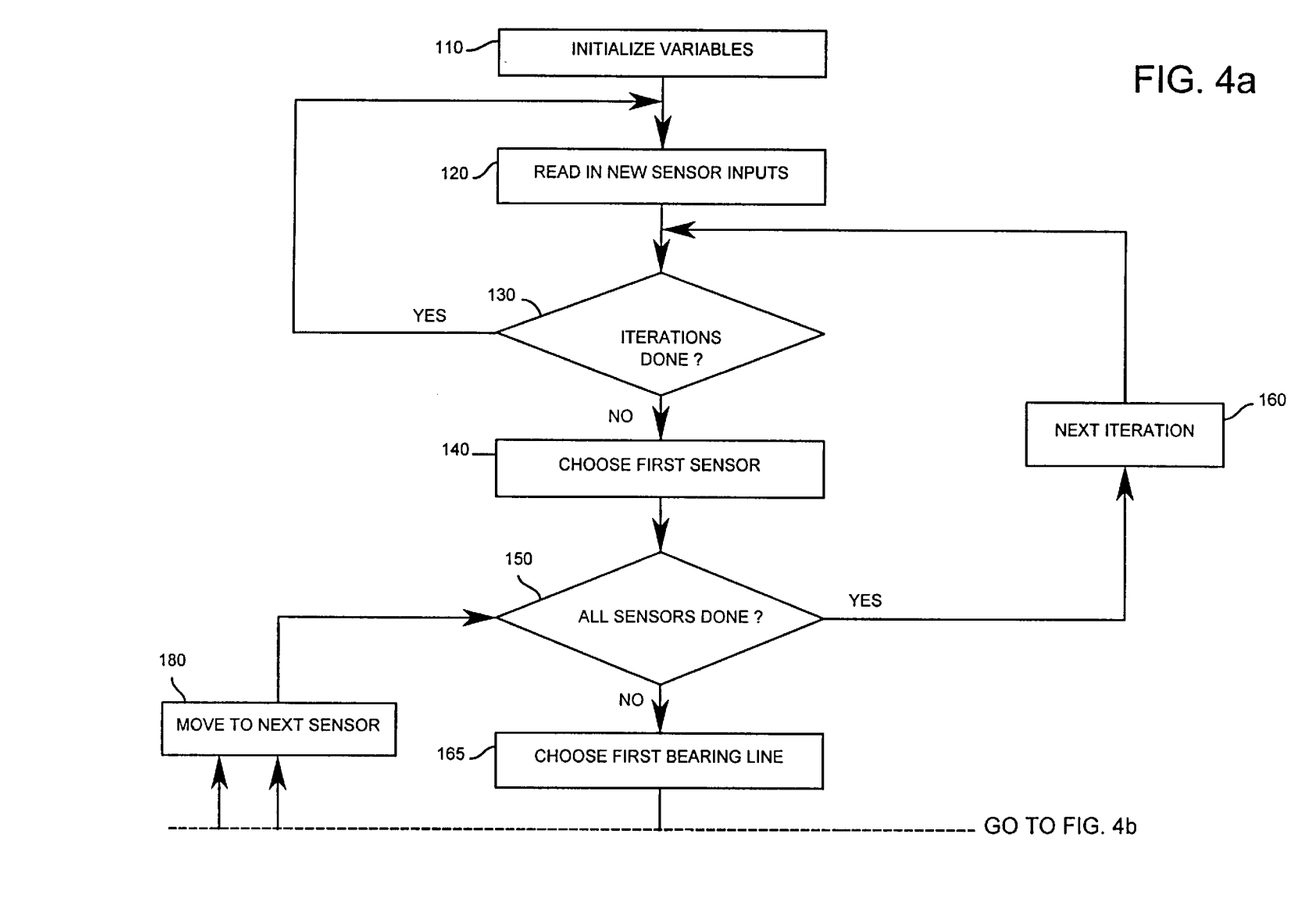
FIG. 4 is a flow chart illustrating the present method of detecting and tracking targets using multiple angle-only sensors.
Figure 4B:
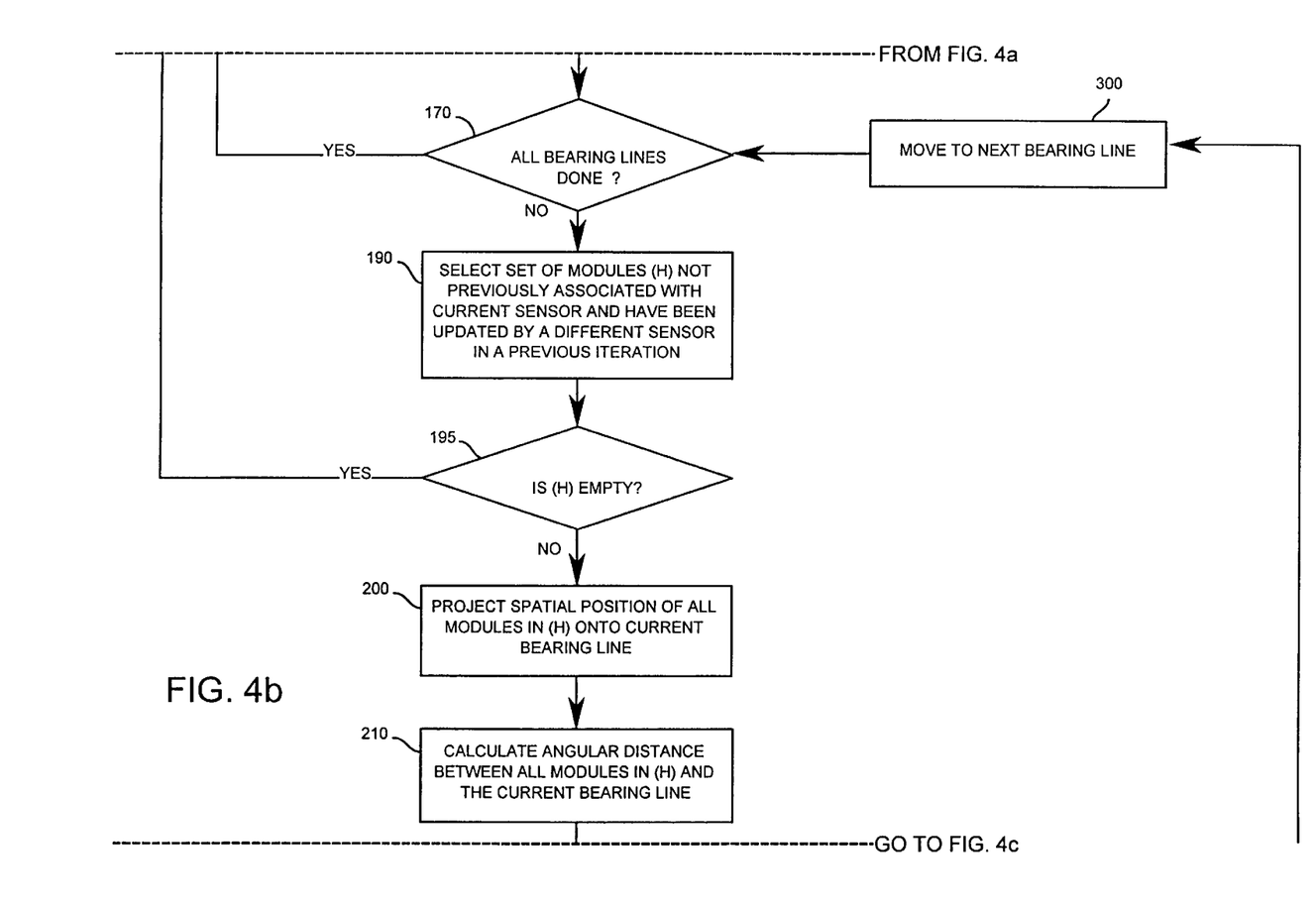
Figure 4C:
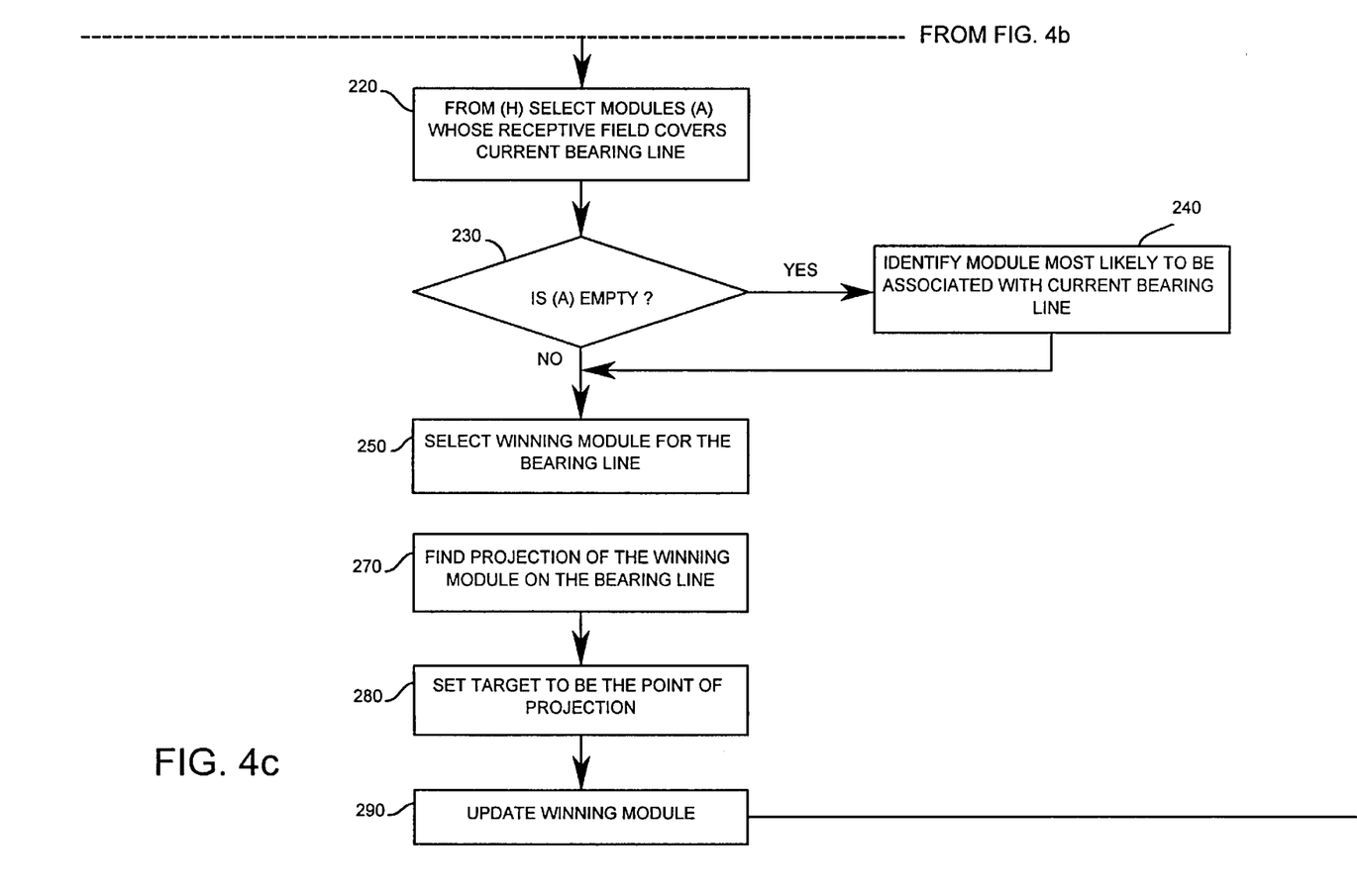

FIG. 4 is a flow diagram illustrating the method of the present invention in further detail. Referring to FIG. 4, a block 110 initializes all variables and parameters. These variables and parameters may include the following.

N—Maximum number of bearing lines detected.

M—Number of modules to use by the algorithm with $M \geq N$.

S—Number of sensors.

$X_{min}, X_{max}, Y_{min}, Y_{max}, Z_{min}, Z_{max}$—Surveillance region limits.

$m_{\mu 1} \leftarrow \text{rand}(X_{min}, X_{max})$ for all $1 \leq \mu \leq M$, where rand(a,b) returns a random number in the range (a,b) with a uniform probability distribution.

$m_{\mu 2} \leftarrow \text{rand}(Y_{min}, Y_{max})$ for all $1 \leq \mu \leq M$.

$m_{\mu 3} \leftarrow \text{rand}(Z_{min}, Z_{max})$ for all $1 \leq \mu \leq M$.

$a_{s\mu} = 0$ for all $1 \leq \mu \leq M$ and $1 \leq s \leq S$. This variable indicates if module $\mu$ has been updated by a bearing from sensor s or not.

$\vec{u}_{s\mu} = \vec{0}$ for all $1 \leq \mu \leq M$ and $1 \leq s \leq S$. Each 3-D vector $\vec{u}_{s\mu}$ represents the direction cosine of the line from the position of sensor s and the last location of module $\mu$ updated by this sensor.

$k_{\mu s} = 0$ for all $1 \leq \mu \leq M$ and $1 \leq s \leq S$.

$l_\mu = 20$ for all $1 \leq \mu \leq M$ $\gamma_h = 0.2$ $\gamma_{h'} = 0.03$ $\epsilon = \pi/50$ $\delta_e = \pi(360 \text{ NS})$ $\alpha = 1$ $T_h = 3.5$ $\text{sig}(x) = (1 + e^{-x})^{-1}$ $h = \text{sig}(\gamma_h l)$ $h' = \text{sig}(\gamma_{h'} l)$ $e_\mu = 0$ for all $1 \leq \mu \leq M$. This is the expectation value of module $\mu$.

$p_\mu = \pi$ for all $1 \leq \mu \leq M$. This is the deformation value of module $\mu$.

$r_\mu = p_\mu h_\mu + e_\mu + \epsilon$. This is the receptive field size of module $\mu$.

$L_\mu = 0$ for all $1 \leq \mu \leq M$. This vector is used to store the sensor number which last updated module $\mu$.

Block 120 incorporates new sensor readings into the bearing angle matrix $\Phi$. Block 130 performs the function of determining if a chosen number of iterations of the algorithm have been completed. The number of iterations is chosen to allow the algorithm to converge to a solution for the locations of the targets. If the specified number of iterations is complete, the algorithm is returns to receive another target angle reading, otherwise control is passed to block 140, which chooses the first sensor for consideration.

After the first sensor is selected, block 150 determines if all sensors have been evaluated for the current iteration. If all sensors have been evaluated, block 160 increments an iteration counter and passes control to block 130. If all sensors have not been evaluated for the current iteration, control is passed to block 165. Block 165 selects the first bearing line for the current sensor. Let the selected bearing line be represented by $\phi_{sk}$. If all bearing lines for a sensor have been evaluated, block 170 passes control to block 180, which increments a sensor counter and passes program control back to block 150.

If all bearing lines have not been evaluated, block 170 passes program control to block 190. Block 190 selects a subset (H) of modules which have not been associated with any bearing angle for the current sensor and have been updated by a different sensor in previous iterations. After subset H has been identified, program control is passed to a block 195. Block 195 tests to see if subset (H) is empty. If (H) is empty, control is passed to block 180 to select another sensor. If (H) is not empty, control is passed to block 200. Block 200 projects the spatial position of all modules in H, onto the current bearing line. This function consists of calculation of a set of vectors $\theta$, which indicate the direction cosines from the sensor under consideration to each module in H. For example, considering some sensor, s and some module $m_j$ the vector $\theta_j=(m_j-y_s)$. The projection of all $\theta_j$ onto the selected bearing line $\phi_{sk}$ can now be calculated by repeated inner product calculations. That is, $z_j=\phi_{sk}\cdot\theta_j$, where $z_j$ represents the magnitude of the projection of $\theta_j$ on $\phi_{sk}$. After the computations regarding the projections are complete, program control is transferred to block 210.

Block 210 calculates the angular distance between all modules in H and the current bearing line being considered. The angular distance can be calculated using the formula, $d_j=\cos^{-1}(z_j/\|\theta_j\|)$, where $d_j$ is the distance between $\phi_{sk}$ and $\theta_j$.

Block 220 selects a subset A from H. Contained in the subset A are modules whose receptive field covers the bearing line under consideration. That is, A is comprised of modules from H whose distance $d_j$ to the selected bearing line is less than their receptive field $r_j$. Note that a receptive field is defined as an angle radius about a module vector $\phi_{sk}$ (See FIG. 2).

Block 230 then tests to see if subset A is an empty set. If subset A is an empty set, block 240 performs the function of determining which module is most likely to be associated with the current bearing line. This determination may be made by either defining a competition vector $C_j$, as $C_j=1/r_j+d_j/h_j$ or as $C_j=d_j$. If A is determined to not be empty or block 240 has been executed, control is passed to block 250.

The function of block 250 is to determine the winning module for the bearing line under evaluation. This is done by finding the index i* for which $C_{i^*}$ is a minimum. After the winning module is determined, program control is passed to a block 270. Block 270 calculates the projection of the winning module onto the bearing line. Block 280 proceeds to set the target point to be the point of the module projection on the bearing line. Block 290 then updates the parameters of the winning module. These parameters may include the position, distortion parameter, locking parameter, expectation parameter, and receptive field size of the module. After the parameters are updated program control is passed to block 300, which selects the next bearing line to be considered. After incrementing the bearing line, Block 300 passes control to block 170, which checks to see if all bearing lines have been considered.

Of course, it should be understood that a range of changes and modifications can be made to the preferred embodiment described above. For example, the competition criteria in selection of the module may be designed to be a weighted sum of angular distance and the locking parameter, and/or the receptive field size of each module. It is therefore intended that the foregoing detailed description be regarded as illustrative rather than limiting and that it be understood that it is the following claims, including all equivalents, which are intended to define the scope of this invention.

What is claimed is:

1. A method of detecting a location of a target using as few as only two angle-only sensors, the steps comprising:

determining a first bearing line from a first sensor to a target;

determining a second bearing line from a second sensor to said target;

distributing modules throughout a search space that includes said target, said modules providing location information;

associating at least one of said modules with said first bearing line;

associating at least one of said modules with said second bearing line;

continuing to associate said at least one of said modules with said first and second bearing lines, the step of continuing to associate occurring without having said bearing lines form triangles and until said at least one of said modules is substantially coincident with said target; and using location information of said at least one of said modules to indicate said location of said target.

2. The method of claim 1, wherein said modules denote current and previous locations in space and are changeable based on said angle-only sensor outputs.

3. The method of claim 1, wherein said associating of said modules and said bearing lines comprises the use of angular distance between said modules and said bearing lines.

4. The method of claim 1, wherein said associating of said modules and said bearing lines comprises the use of the proximity of receptive fields of said modules to said bearing lines.

5. The method of claim 1, wherein said associating of said modules and said bearing lines comprises the calculation of a competition vector based on parameters of said modules.

6. The method of claim 1, wherein said method tracks and detects targets in two or three dimensional space.

7. An apparatus for detecting and tracking multiple targets comprising as few as only two sensors in communication with a signal processing installation, wherein the signal processing installation:

determines a first bearing line from a first sensor to a target;

determines a second bearing line from a second sensor to said target;

distributes modules throughout a search space that includes said target, said modules providing location information;

associates at least one of said modules with said first bearing line;

associates at least one of said modules with said second bearing line;

continues to associate said at least one of said modules with said first and second bearing lines without having said bearing lines form triangles and until said at least one of said modules is substantially coincident with said target; and indicates said location of said target.

8. The apparatus of claim 7, wherein said sensors output signals representative of a target position.

9. The apparatus of claim 7, wherein said sensors provide only angle position information of said targets.

10. The apparatus of claim 7, wherein said signal processing installation comprises a conventional workstation computer.

11. The apparatus of claim 7, wherein said sensors are distributed within three dimensional space.

12. A method of detecting a location of a target using angle-only sensors, the steps comprising:

determining a first bearing line from a first sensor to a target;

determining a second bearing line from a second sensor to said target;

distributing modules throughout a search space that includes said target, said modules providing location information;

associating at least one of said modules with said first bearing line;

associating at least one of said modules with said second bearing line;

continuing to associate said at least one of said modules with said first and second bearing lines such that said at least one of said modules moves to a plurality of positions that converge on said target; and using location information of said at least one of said modules to indicate said location of said target.

13. The method of claim 12, wherein the steps of associating said modules and said bearing lines comprise the step of determining an angular distance between said modules and said bearing lines.

14. The method of claim 12, wherein the steps of associating said modules and said bearing lines comprise the step of determining a proximity between said bearing lines and receptive fields associated with said modules.

15. The method of claim 12, wherein said positions define a plurality of paths between said positions, and each of said paths perpendicularly intersects one of said bearing lines.

16. A method of detecting a location of a real target using at least two angle-only sensors, the steps comprising:

determining a first bearing line from a first sensor to said real target;

determining a second bearing line from a second sensor to said real target;

distributing modules throughout a search space that includes said real target;

alternately moving at least one of said modules between said first and second bearing lines;

producing a plurality of positions of said at least one of said modules, said positions being on said first and second bearing lines and sequentially converging on said real target; and locating said real target with said positions and in the absence of discriminating between said real target and a false target.

17. An apparatus for detecting and tracking multiple targets comprising at least two sensors in communication with a signal processing installation, wherein the signal processing installation:

determines a first bearing line from a first sensor to a target;

determines a second bearing line from a second sensor to said target;

distributes modules throughout a search space that includes said target, said modules providing location information;

associates at least one of said modules with said first bearing line;

associates at least one of said modules with said second bearing line;

continues to associate said at least one of said modules with said first and second bearing lines at a plurality of positions that converge on said target; and indicates said location of said target.

* * * * *